US009437866B2

United States Patent
Kikuchi et al.

(10) Patent No.: US 9,437,866 B2
(45) Date of Patent: Sep. 6, 2016

(54) PROCESS FOR PRODUCING LITHIUM VANADIUM PHOSPHATE-CARBON COMPOSITE

(75) Inventors: Tsutomu Kikuchi, Tokyo (JP); Kazuki Takimoto, Tokyo (JP); Hideo Yanagita, Tokyo (JP)

(73) Assignees: NIPPON CHEMICAL INDUSTRIAL CO., LTD., Tokyo (JP); FUJI JUKOGYO KABUSHIKI KAISHA, Tokyo (JP)

( * ) Notice: Subject to any disclaimer, the term of this patent is extended or adjusted under 35 U.S.C. 154(b) by 300 days.

(21) Appl. No.: 13/823,612

(22) PCT Filed: Sep. 22, 2011

(86) PCT No.: PCT/JP2011/071593
§ 371 (c)(1),
(2), (4) Date: May 2, 2013

(87) PCT Pub. No.: WO2012/043367
PCT Pub. Date: Apr. 5, 2012

(65) Prior Publication Data
US 2013/0214462 A1  Aug. 22, 2013

(30) Foreign Application Priority Data
Sep. 27, 2010 (JP) .................................. 2010-216038

(51) Int. Cl.
H01M 4/1397 (2010.01)
H01M 4/13 (2010.01)
(Continued)

(52) U.S. Cl.
CPC ............ *H01M 4/1397* (2013.01); *C01B 25/45* (2013.01); *H01M 4/04* (2013.01); *H01M 4/13* (2013.01);
(Continued)

(58) Field of Classification Search
CPC ................................................. H01M 4/1397
See application file for complete search history.

(56) References Cited

U.S. PATENT DOCUMENTS 6,855,462 B2    2/2005 Barker et al.
8,168,329 B2 *  5/2012 Liaw et al. ................ 429/218.1
(Continued)

FOREIGN PATENT DOCUMENTS

CN    101542786 A    9/2009
EP    1921698 A2    5/2008
(Continued)

OTHER PUBLICATIONS

Extended European Search Report dated Feb. 25, 2014, issued in corresponding European application No. 11828924.8, (6 pages).
(Continued)

*Primary Examiner* — Erin Snelting
(74) *Attorney, Agent, or Firm* — Westerman, Hattori, Daniels & Adrian, LLP (57) ABSTRACT

A process for producing a lithium vanadium phosphate-carbon composite includes a first step that includes mixing a lithium source, a tetravalent or pentavalent vanadium compound, a phosphorus source, and a conductive carbon material source that produces carbon through pyrolysis, in an aqueous solvent to prepare a raw material mixture, a second step that includes heating the raw material mixture to effect a precipitation reaction to obtain a reaction mixture that includes a precipitate, a third step that includes subjecting the reaction mixture that includes the precipitate to wet grinding using a media mill to obtain a slurry that includes ground particles, a fourth step that includes spray-drying the slurry that includes the ground particles to obtain a reaction precursor, and a fifth step that includes calcining the reaction precursor at 600 to 1300° C. in an inert gas atmosphere or a reducing atmosphere. A lithium vanadium phosphate-carbon composite produced by the process may provide a lithium secondary battery with excellent battery performance (e.g., high discharge capacity) when used as a cathode active material.

7 Claims, 3 Drawing Sheets (51) Int. Cl.
  *H01M 4/58* (2010.01)
  *C01B 25/45* (2006.01)
  *H01M 4/04* (2006.01)
  *H01M 4/136* (2010.01)
  *H01M 10/0525* (2010.01)
  *H01M 4/62* (2006.01)

(52) U.S. Cl.
  CPC .......... *H01M 4/136* (2013.01); *H01M 4/5825* (2013.01); *H01M 4/625* (2013.01); *H01M 10/0525* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 2001/0021472 A1 | 9/2001 | Barker et al. | |
| 2008/0305256 A1* | 12/2008 | Kimble | H01M 4/5825 427/215 |
| 2010/0301281 A1* | 12/2010 | Hibst | C01B 25/45 252/507 |
| 2011/0072649 A1 | 3/2011 | Tokita et al. | |

FOREIGN PATENT DOCUMENTS

| | | |
|---|---|---|
| JP | 2001-500665 A | 1/2001 |
| JP | 2002-530835 A | 9/2002 |
| JP | 2008-052970 A | 3/2008 |
| JP | 2011-096641 A | 5/2011 |
| JP | 2011-198629 A | 10/2011 |
| TW | 200932671 A | 8/2009 |
| WO | 2004/093217 A2 | 10/2004 |
| WO | 2009/043730 A2 | 4/2009 |

OTHER PUBLICATIONS

International Search Report of PCT/JP2011/071593, mailing date of Dec. 13, 2011.

Office Action dated Dec. 31, 2014, issued in corresponding Chinese Patent Application No. 201180046552.0, with English translation (15 pages).

Office Action dated Jan. 28, 2015, issued in corresponding Taiwanese Patent Application No. 100134727, with English translation (11 pages).

* cited by examiner

Fig.6

PROCESS FOR PRODUCING LITHIUM VANADIUM PHOSPHATE-CARBON COMPOSITE

TECHNICAL FIELD

The invention relates to a process for producing a lithium vanadium phosphate-carbon composite that includes lithium vanadium phosphate and a conductive carbon material, and is useful as a cathode active material for a lithium secondary battery.

BACKGROUND ART

A lithium-ion battery has been widely used as a battery for portable instruments, notebook-sized personal computers, electric vehicles, and hybrid vehicles. A lithium-ion battery normally has excellent capacity and energy density, and $LiCoO_2$ has been mainly used as the cathode material for a lithium-ion battery. However, since cobalt is a rare resource, use of $LiMnO_2$ and $LiNiO_2$ as the cathode material has been extensively studied.

In recent years, $LiFePO_4$ has attracted attention as an alternative material, and has been extensively studied. Since Fe is an abundant resource, and $LiFePO_4$ exhibits excellent high-temperature properties in spite of relatively low energy density, $LiFePO_4$ has been expected to be a cathode material for an electric vehicle lithium-ion battery.

However, since $LiFePO_4$ has relatively low electron conductivity, lithium vanadium phosphate ($Li_3V_2(PO_4)_3$) that includes V instead of Fe, and has a NASICON (Na super ionic conductor) structure, has attracted attention.

It has been known that lithium vanadium phosphate may be produced by mixing and grinding a lithium source, a vanadium compound, and a phosphorus source, forming the resulting homogenous mixture into pellets, and calcining the pellets (see Patent Documents 1 and 2, for example). Patent Document 3 discloses a method in which vanadium oxide is dissolved in an aqueous solution that contains lithium hydroxide, a phosphorus source and carbon and/or a non-volatile organic compound are added to the solution, the resulting raw material mixture is dried to obtain a precursor, and the precursor is heated in an inert gas atmosphere to obtain a composite of $Li_3V_2(PO_4)_3$ and a conductive carbon material.

RELATED-ART DOCUMENT

Patent Document

Patent Document 1: JP-T-2001-500665
Patent Document 2: JP-T-2002-530835
Patent Document 3: JP-A-2008-052970

SUMMARY OF THE INVENTION

Technical Problem $Li_3V_2(PO_4)_3$ has a theoretical capacity as high as 197 mAhg$^{-1}$.

However, since a lithium secondary battery that utilizes $Li_3V_2(PO_4)_3$ as the cathode active material has a low discharge capacity, a further improvement in discharge capacity has been desired.

An object of the invention is to provide a process for producing a lithium vanadium phosphate-carbon composite that may be useful as the cathode active material for a lithium secondary battery, and may provide a lithium secondary battery with excellent battery performance (e.g., high discharge capacity) when used as the cathode active material.

Solution to Problem

The inventors of the invention conducted extensive studies in order to achieve the above object. As a result, the inventors found that a lithium secondary battery that utilizes a lithium vanadium phosphate-carbon composite that is obtained by specific steps and includes lithium vanadium phosphate and a conductive carbon material as the cathode active material has a high discharge capacity, and exhibits excellent cycle characteristics. This finding has led to the completion of the invention.

According to one aspect of the invention, a process for producing a lithium vanadium phosphate-carbon composite that includes lithium vanadium phosphate having a NASICON structure, and a conductive carbon material, includes:

a first step that includes mixing a lithium source, a tetravalent or pentavalent vanadium compound, a phosphorus source, and a conductive carbon material source that produces carbon through pyrolysis, in an aqueous solvent to prepare a raw material mixture;

a second step that includes heating the raw material mixture to effect a precipitation reaction to obtain a reaction mixture that includes a precipitate;

a third step that includes subjecting the reaction mixture that includes the precipitate to wet grinding using a media mill to obtain a slurry that includes ground particles;

a fourth step that includes spray-drying the slurry that includes the ground particles to obtain a reaction precursor; and a fifth step that includes calcining the reaction precursor at 600 to 1300° C. in an inert gas atmosphere or a reducing atmosphere.

Advantageous Effects of the Invention

One aspect of the invention can industrially advantageously provide a lithium vanadium phosphate-carbon composite that includes lithium vanadium phosphate and a conductive carbon material, and is useful as a cathode active material for a lithium secondary battery. A lithium secondary battery that utilizes a lithium vanadium phosphate-carbon composite obtained by the production process according to one aspect of the invention as the cathode active material has a high discharge capacity, and exhibits excellent cycle characteristics.

DESCRIPTION OF EMBODIMENTS

Exemplary embodiments of the invention are described below.

A lithium vanadium phosphate-carbon composite obtained by a production process according to one embodiment of the invention includes lithium vanadium phosphate having a NASICON structure (hereinafter may be referred to as "lithium vanadium phosphate"), and a conductive carbon material.

The lithium vanadium phosphate is a lithium vanadium phosphate represented by the following general formula (1), or a lithium vanadium phosphate obtained by adding an Me element (Me is a metal element or a transition metal element other than V that has an atomic number equal to or larger than 11) to the lithium vanadium phosphate represented by the general formula (1).

$$Li_xV_y(PO_4)_3 \quad (1)$$

wherein x is 2.5 to 3.5, and y is 1.8 to 2.2.

x is preferably 2.5 to 3.5, and particularly preferably 2.8 to 3.2. y is preferably 1.8 to 2.2, and particularly preferably 1.9 to 2.1. The Me element is preferably Mg, Ca, Al, Mn, Co, Ni, Fe, Ti, Zr, Bi, Cr, Nb, Mo, or Cu.

The process for producing a lithium vanadium phosphate-carbon composite according to one embodiment of the invention includes a first step that includes mixing a lithium source, a tetravalent or pentavalent vanadium compound (hereinafter referred to as "vanadium compound"), a phosphorus source, and a conductive carbon material source that produces carbon through pyrolysis, in an aqueous solvent to prepare a raw material mixture, a second step that includes heating the raw material mixture to effect a precipitation reaction to obtain a reaction mixture that includes a precipitate, a third step that includes subjecting the reaction mixture that includes the precipitate to wet grinding using a media mill to obtain a slurry that includes ground particles, a fourth step that includes spray-drying the slurry that includes the ground particles to obtain a reaction precursor, and a fifth step that includes calcining the reaction precursor at 600 to 1300° C. in an inert gas atmosphere or a reducing atmosphere.

The first step includes mixing the lithium source, the vanadium compound, the phosphorus source, and the conductive carbon material source that produces carbon through pyrolysis, in the aqueous solvent to obtain a raw material mixture in which each raw material is dissolved or dispersed.

Examples of the lithium source include organic or inorganic lithium salts such as lithium carbonate, lithium hydroxide, lithium oxide, lithium nitrate, and lithium oxalate. These organic or inorganic lithium source may be a hydrate or an anhydride. It is preferable to use lithium hydroxide since the reaction can be advantageously effected on an industrial scale due to high solubility in water.

Examples of the vanadium compound include vanadium pentoxide, ammonium vanadate, vanadium oxyoxalate, and the like. It is preferable to use vanadium pentoxide since vanadium pentoxide is inexpensive, and a reaction precursor that exhibits excellent reactivity can be obtained.

Examples of the phosphorus source include phosphoric acid, polyphosphoric acid, phosphoric anhydride, ammonium dihydrogen phosphate, diammonium hydrogen phosphate, ammonium phosphate, and the like. It is preferable to use phosphoric acid since phosphoric acid is inexpensive, and a reaction precursor that exhibits excellent reactivity can be obtained.

The vanadium compound is preferably used so that the molar ratio (V/P) of the V atoms included in the vanadium compound to the P atoms included in the phosphorus source is 0.50 to 0.80 (more preferably 0.60 to 0.73) since single-phase lithium vanadium phosphate can be easily obtained as the final product, and the discharge capacity relatively increases. The lithium source is preferably used so that the molar ratio (Li/P) of the Li atoms included in the lithium source to the P atoms included in the phosphorus source is 0.70 to 1.30 (more preferably 0.83 to 1.17) since single-phase lithium vanadium phosphate can be easily obtained as the final product, and the discharge capacity relatively increases.

A conductive carbon material source that produces carbon through pyrolysis at least when calcined in the fifth step is used as the conductive carbon material source. The conductive carbon material source provides lithium vanadium phosphate with conductivity, and promotes reduction of the vanadium compound during the precipitation reaction in the second step described later. The conductive carbon material source also suppresses oxidation of vanadium reduced during the process, and contributes to production of a lithium vanadium phosphate-carbon composite having stable quality.

Examples of the conductive carbon material source include coal-tar pitches (soft to hard grade); coal-derived heavy oils such as dry distillation liquid oil; heavy oils such as atmospheric residual oil and vacuum residual oil; petroleum heavy oils such as ethylene tar obtained as a by-product due to thermal cracking of crude oil, naphtha, or the like; aromatic hydrocarbons such as acenaphthylene, decacyclene, anthracene, and phenanthrene; polyphenylenes such as phenazine, biphenyl, and terphenyl; polyvinyl chloride; water-soluble polymers such as polyvinyl alcohol, polyvinyl butyral, and polyethylene glycol, and insolubilized products thereof; nitrogen-containing polyacrylonitrile; organic polymers such as polypyrrole; organic polymers such as polythiophene and polystyrene; natural polymers such as saccharides (e.g., glucose, fructose, lactose, maltose, and sucrose); thermoplastic resins such as polyphenylene sulfide and polyphenylene oxide; and thermosetting resins such as phenol-formaldehyde resins and imide resins. Among these, it is preferable to use saccharides since saccharides are inexpensive, and a lithium secondary battery that utilizes the resulting lithium vanadium phosphate-carbon composite as the cathode active material has a high discharge capacity, and exhibits excellent cycle characteristics.

The conductive carbon material source is preferably used so that the carbon atom content in the resulting lithium vanadium phosphate-carbon composite is 0.1 to 20 mass % based on the amount of lithium vanadium phosphate.

The carbon atom content in the conductive carbon material tends to decrease due to calcination. When the conductive carbon material source is used in the first step so that the amount of carbon atoms is 0.5 to 40 parts by mass (preferably 5 to 30 parts by mass) based on 100 parts by mass of lithium vanadium phosphate, the resulting lithium vanadium phosphate-carbon composite includes the conductive carbon material (carbon atoms) in an amount of 0.1 to 20 parts by mass (preferably 1 to 15 parts by mass) based on 100 parts by mass of lithium vanadium phosphate. When the amount of the conductive carbon material source is within the above range based on 100 parts by mass of lithium vanadium phosphate, sufficient conductivity can be obtained when using the lithium vanadium phosphate-carbon composite as the cathode active material for a lithium secondary battery, so that the internal resistance of the lithium secondary battery can be reduced, and the discharge capacity per mass or volume can be increased. If the amount of the conductive carbon material source is less than the above range based on 100 parts by mass of lithium vanadium phosphate, sufficient conductivity may not be obtained when using the lithium vanadium phosphate-carbon composite as the cathode active material for a lithium secondary battery, and the internal resistance of the lithium secondary battery may increase. If the amount of the conductive carbon material source exceeds the above range, the discharge capacity per mass or volume may decrease.

The total content of the lithium source, the vanadium compound, the phosphorus source, and the conductive carbon material source in the raw material mixture may be determined depending on the type of each raw material, but is preferably 5 to 50 wt %, and more preferably 10 to 30 wt %, from the viewpoint of operability and economic efficiency.

A lithium source, a vanadium compound, a phosphorus source, and a conductive carbon material source produced by an arbitrary method may be used in the first step. It is preferable that the lithium source, the vanadium compound, the phosphorus source, and the conductive carbon material source have an impurity content as low as possible in order to produce a high-purity lithium vanadium phosphate-carbon composite.

The lithium source, the vanadium compound, the phosphorus source, and the conductive carbon material source may be added to the aqueous solvent in an arbitrary order, and may be mixed by an arbitrary method. It suffices that a raw material mixture in which each raw material is uniformly dissolved or dispersed can be obtained.

In the second step, the raw material mixture obtained by the first step in which each raw material is uniformly mixed is heated to a specific temperature to effect a precipitation reaction to obtain a reaction mixture that includes a precipitate.

A reduction reaction of the vanadium compound and a plurality of other reactions occur during the precipitation reaction effected in the second step, and the precipitate has a complex composition. When the composition of the precipitate is identified by X-ray diffraction analysis, at least peaks attributed to lithium phosphate and vanadium hydrogen phosphate are obtained as main peaks. The precipitate also includes the lithium compound, the vanadium compound, reaction products thereof, and the like. These compounds may be present in the precipitate as long as the advantageous effects of the invention are not impaired.

When calcining a spray-dried product obtained by directly spray-drying the raw material mixture, it is difficult to control the particle size, and a narrow particle size distribution may not be obtained. In contrast, since the precipitate obtained by the second step consists of aggregates of soft particles that have an average particle sizes (secondary particle size) of 10 to 100 μm (preferably 20 to 70 μm) and can be ground, the particles can be ground in the third step to have an average particle size of 2 μm or less (preferably 0.1 to 2 μm). Since the precipitate grows to only a small extent when calcined in the fifth step, it is easy to control the primary particle size and the secondary particle size.

When using the production process according to one embodiment of the invention, a lithium vanadium phosphate-carbon composite that includes single-phase lithium vanadium phosphate and a conductive carbon material can be obtained (when determined by X-ray diffraction analysis) by subjecting the precipitate to the third step and the fourth step to obtain a reaction precursor, and calcining the reaction precursor in the fifth step. A lithium secondary battery that utilizes a lithium vanadium phosphate-carbon composite obtained by the production process according to one embodiment of the invention as the cathode active material has a high discharge capacity, and exhibits excellent cycle characteristics as compared with the case of using a product obtained by calcining a spray-dried product obtained by directly spray-drying the raw material mixture.

The heating temperature in the second step is 60 to 100° C., and preferably 80 to 100° C. If the heating temperature is less than 60° C., a long reaction time may be required (i.e., it is industrially disadvantageous). If the heating temperature exceeds 100° C., it may be necessary to use a pressure vessel (i.e., it is industrially disadvantageous).

The heating time in the second step is not particularly limited. A precipitate can be obtained by heating the raw material mixture for 0.2 hours or more (preferably 0.5 to 2 hours).

The reaction mixture that includes the precipitate obtained by heating the raw material mixture in the second step is subjected to the third step optionally after adjusting the concentration of the reaction mixture.

In the third step, the reaction mixture that includes the precipitate obtained by the second step is subjected to wet grinding using a media mill to obtain a slurry that includes ground particles.

The solid content in the reaction mixture that includes the precipitate subjected to wet grinding using the media mill is preferably 5 to 50 wt %, and particularly preferably 10 to 30 wt % from the viewpoint of operability and a capability to efficiently grind the precipitate. Therefore, it is preferable to subject the reaction mixture that includes the precipitate obtained by the second step to the third step after adjusting the concentration of the reaction mixture so that the solid content in the reaction mixture is within the above range.

The reaction mixture that includes the precipitate is then subjected to wet grinding using the media mill. Since the precipitate can be more finely ground by utilizing the above method, a reaction precursor that exhibits excellent reactivity can be obtained.

Examples of the media mill include a bead mill, a ball mill, a paint shaker, an attritor, a sand mill, and the like. It is preferable to use a bead mill as the media mill. When using a bead mill, the operating conditions, and the type and the size of beads may be appropriately selected depending on the size and the processing amount of the bead mill.

A dispersant may be added to the reaction mixture that includes the precipitate in order to more efficiently perform the grinding operation using the media mill. An appropriate dispersant may be selected depending on the type of the media mill. Examples of the dispersant include a surfactant, an ammonium polycarboxylate, and the like. The concentration of the dispersant in the reaction mixture is preferably 0.01 to 10 wt %, and more preferably 0.1 to 5 wt %, since a sufficient diffusion effect can be obtained.

In the third step, the reaction mixture is preferably subjected to wet grinding using the media mill until the ground particles have an average particle size (determined by a laser scattering/diffraction method) of 2 μm or less (more preferably 0.1 to 2 μm). In this case, a reaction precursor that exhibits excellent reactivity can be obtained, and a intra-lot variation in battery characteristics can be suppressed.

A slurry that includes ground particles can be obtained by the third step.

In the fourth step, the slurry that includes the ground particles obtained by the third step is spray-dried to obtain a reaction precursor.

The slurry may be dried by a method other than a spray-drying method. However, the production process according to one embodiment of the invention spray-dries the slurry based on the finding that it is advantageous to use a spray-drying method.

More specifically, a granulated product that uniformly contains fine ground particles and a fine conductive carbon material source, and densely contains the raw material particles can be obtained by spray-drying the slurry. Therefore, a composite of single-phase lithium vanadium phosphate (determined by X-ray powder diffraction analysis) and the conductive carbon material can be obtained by utilizing the granulated product as the reaction precursor, and calcining the reaction precursor in the fifth step.

When using the spray-drying method, the slurry is atomized (sprayed) using a specific means, and the resulting fine droplets are dried to obtain a reaction precursor. The slurry may be atomized using a rotating disc or a pressure nozzle. It suffices that the slurry can be atomized.

When using the spray-drying method, the drying stability and the properties of the resulting dry powder are affected by the relationship between the size of the droplets of the atomized slurry and the particle size of the ground particles contained therein. If the particle size of the ground particles is too small with respect to the size of the droplets of the atomized slurry, the droplets may become unstable, and may not be dried successfully. The size of the droplets of the atomized slurry is preferably 5 to 100 μm, and particularly preferably 10 to 50 μm, from the above point of view. It is desirable to determine the amount of the slurry to be supplied to a spray dryer taking account of the above point.

The reaction precursor obtained by spray drying is calcined in the fifth step. The powder characteristics (e.g., average particle size) of the resulting lithium vanadium phosphate-carbon composite are mainly determined by the characteristics of the reaction precursor. In order to control the particle size of the target lithium vanadium phosphate-carbon composite, it is preferable to spray-dry the slurry in the fourth step so that the secondary particles of the reaction precursor have a particle size determined by scanning electron microscope (SEM) observation of 5 to 100 μm (particularly preferably 10 to 50 μm).

It is preferable to adjust the hot blast inlet temperature of the spray dryer to 200 to 250° C. (more preferably 210 to 240° C.), and adjust the hot blast outlet temperature to 100 to 150° C. (more preferably 105 to 130° C.) in order to prevent a situation in which the powder absorbs moisture, and facilitate collection of the powder.

The reaction precursor obtained by the fourth step is calcined in the fifth step at 600 to 1300° C. in an inert gas atmosphere or a reducing atmosphere to obtain the target lithium vanadium phosphate-carbon composite.

In the fifth step, the reaction precursor obtained by the fourth step is calcined at 600 to 1300° C. to obtain a lithium vanadium phosphate-carbon composite of single-phase lithium vanadium phosphate (determined by X-ray powder diffraction analysis) and the conductive carbon material.

The calcination temperature in the fifth step is 600 to 1300° C., and preferably 800 to 1000° C. If the calcination temperature is less than 600° C., a long calcination time may be required to obtain single-phase lithium vanadium phosphate (i.e., it is industrially disadvantageous). If the calcination temperature exceeds 1300° C., lithium vanadium phosphate may be melted.

In the fifth step, the reaction precursor is calcined in an inert gas atmosphere or a reducing atmosphere in order to prevent a situation in which vanadium is oxidized, and the phosphorus source is melted.

The calcination time in the fifth step is not particularly limited. A lithium vanadium phosphate-carbon composite of single-phase lithium vanadium phosphate (determined by X-ray powder diffraction analysis) and the conductive carbon material can be obtained when the calcination time is 1 hour or more (preferably 2 to 12 hours).

In the fifth step, the lithium vanadium phosphate-carbon composite obtained by calcination may optionally be further calcined a plurality of times.

The lithium vanadium phosphate-carbon composite obtained by the fifth step may optionally be disintegrated, ground, and classified.

The battery performance (e.g., cycle characteristics) may be further improved by mixing an Me source (Me is a metal element or a transition metal element other than V that has an atomic number equal to or larger than 11) into the raw material mixture obtained by the first step, and then performing the second to fifth steps. In this case, a product that includes the lithium vanadium phosphate represented by the general formula (1) and the Me element, or a lithium vanadium phosphate-carbon composite that includes the Me element can be obtained.

Me is a metal element or a transition metal element other than V that has an atomic number equal to or larger than 11. Examples of a preferable Me element include Mg, Ca, Al, Mn, Co, Ni, Fe, Ti, Zr, Bi, Cr, Nb, Mo, Cu, and the like. These elements may be used either alone or in combination.

Examples of the Me source include oxides, hydroxides, halides, carbonates, nitrates, sulfates, organic acid salts, and the like that include the Me element. Note that the Me source may be dissolved in the raw material mixture obtained by the first step, or may be present in the raw material mixture obtained by the first step as a solid. When the Me source is incorporated in the raw material mixture as a solid, a reaction precursor that exhibits excellent reactivity can be obtained when the Me source has an average particle size of 100 μm or less (more preferably 0.1 to 50 μm).

The Me source is preferably mixed so that the molar ratio (M/P) of the total (V+Me=M) of the V atoms included in the vanadium compound and the Me atoms included in the Me source to the P atoms included in the phosphorus source is 0.50 to 0.80 (more preferably 0.60 to 0.73), and the molar ratio (Me/V) of the Me atoms included in the Me source to the V atoms included in the vanadium compound is more than 0 and 0.45 or less (more preferably more than 0 and 0.1 or less). Note that the amount of the Me source may be changed depending on the type of the Me element.

A lithium vanadium phosphate-carbon composite obtained by the production process according to one embodiment of the invention includes single-phase lithium vanadium phosphate (determined by X-ray powder diffraction analysis) and the conductive carbon material. It is preferable that the lithium vanadium phosphate-carbon composite have a configuration in which lithium vanadium phosphate aggregates are coated with the conductive carbon material, wherein primary particles having an average particle size of 10 μm or less, and preferably 0.01 to 5 μm aggregate to form secondary particles having an average particle size of 1 to 100 μm, and preferably 1 to 30 μm. In this case, a high discharge capacity can be obtained when using the lithium vanadium phosphate-carbon composite as a cathode active material for a lithium secondary battery.

When the lithium vanadium phosphate-carbon composite has a BET specific surface area of 15 to 50 m$^2$/g, and preferably 20 to 45 m$^2$/g, a paste prepared using the lithium vanadium phosphate-carbon composite exhibits excellent properties. In this case, since the composite is formed in a state in which the conductive carbon material is advantageously dispersed in lithium vanadium phosphate, excellent conductivity can be achieved.

EXAMPLES

The invention is further described below by way of examples. Note that the invention is not limited to the following examples.

Example 1

First Step

A 5 L beaker was charged with 2 L of ion-exchanged water. After the addition of 605 g of 85% phosphoric acid, 220 g of lithium hydroxide, 320 g of vanadium pentoxide, and 170 g of sucrose, the mixture was stirred at room temperature (25° C.) to obtain an ocherous raw material mixture.

Second Step

The raw material mixture was heated at 95° C. for 1 hour with stirring to effect a precipitation reaction to obtain a green reaction mixture including a precipitate.

The average particle size of the precipitate was measured using a laser scattering/diffraction particle size analyzer ("9320-X100" manufactured by Nikkiso Co., Ltd.), and found to be 30 µm.

Third Step

After cooling the reaction mixture, the reaction mixture was ground using a bead mill (wet grinder) charged with zirconia balls having a diameter of 0.5 mm until the ground particles contained in the reaction mixture had an average particle size ($D_{50}$) of 2.0 µm or less to obtain a dispersion slurry.

Fourth Step

The dispersion slurry was supplied to a spray dryer (hot blast inlet temperature: 230° C., hot blast outlet temperature: 120° C.) to obtain a reaction precursor. The average particle size of the secondary particles of the reaction precursor determined by SEM observation was 25 µm.

Figure 1:
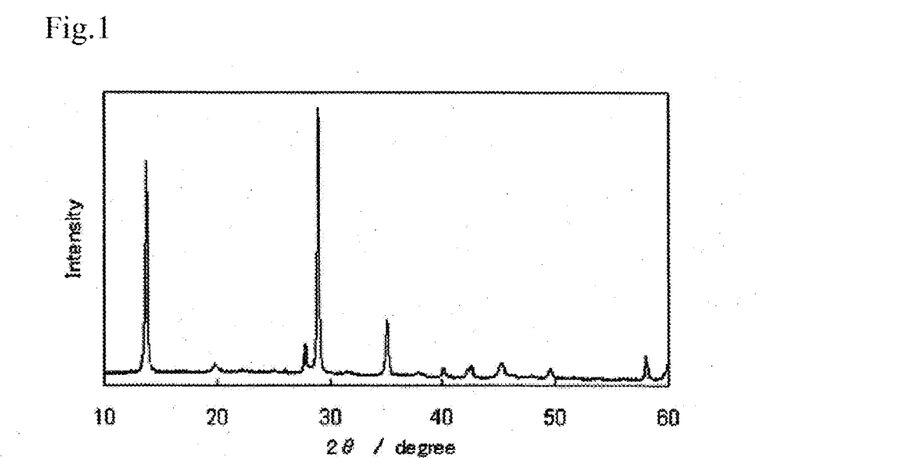
FIG. 1 shows the X-ray diffraction chart of the reaction precursor obtained by the fourth step in Example 1.
Figure 2:
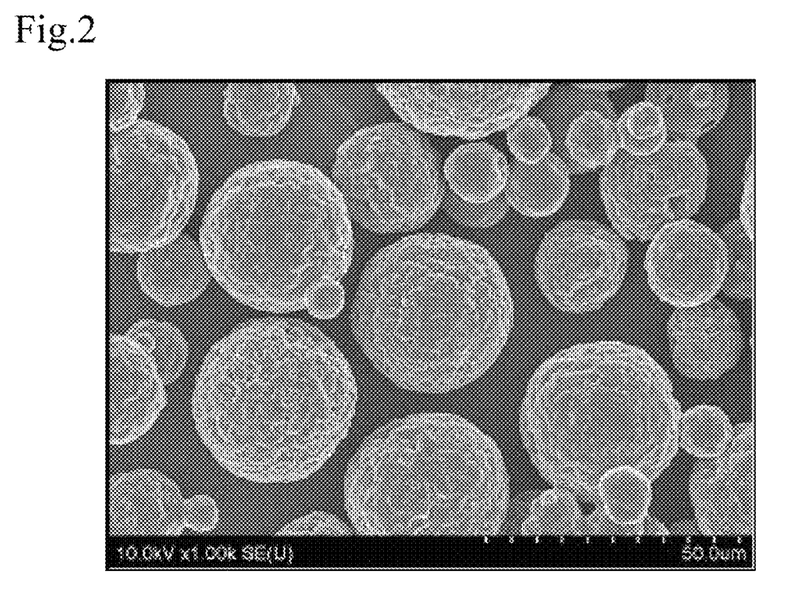
FIG. 2 shows the SEM image of the reaction precursor obtained by the fourth step in Example 1.

The reaction precursor was subjected to X-ray powder diffraction measurement using CuKα-rays. A diffraction peak (2θ=14°) attributed to lithium phosphate, a diffraction peak (2θ=29°) attributed to vanadium hydrogen phosphate, and a diffraction peak attributed to an unidentified crystalline compound were observed. It was thus confirmed that the reaction precursor was a mixture of lithium phosphate, vanadium hydrogen phosphate, and an unidentified crystalline compound. FIG. 1 shows the X-ray diffraction chart of the reaction precursor. FIG. 2 shows an electron micrograph (SEM image) of the reaction precursor.

The average particle size of the secondary particles of the reaction precursor was calculated as described below. The SEM image of the secondary particles was analyzed, and the secondary particles were projected two-dimensionally. An arbitrary two hundred secondary particles were extracted, and the particle size of each extracted secondary particle was measured. The particle sizes of the two hundred extracted secondary particles were averaged to calculate the average particle size of the secondary particles of the reaction precursor.

Fifth Step

The reaction precursor was placed in a saggar made of mullite, and calcined at 900° C. for 12 hours in a nitrogen atmosphere.

Figure 3:
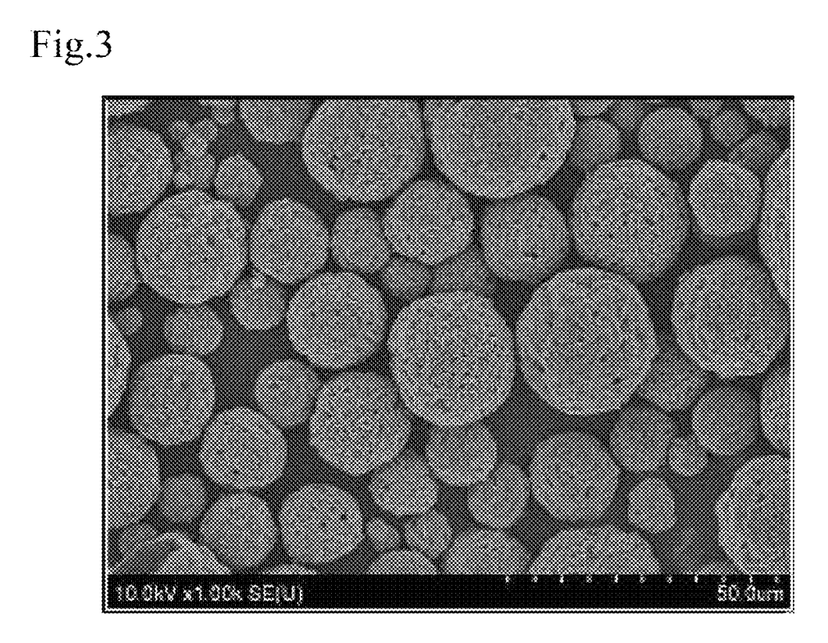
FIG. 3 shows the SEM image of the lithium vanadium phosphate-carbon composite sample obtained in Example 1.

FIG. 3 shows an electron micrograph (SEM image) of the resulting lithium vanadium phosphate-carbon composite sample.

Example 2

First Step

A 5 L beaker was charged with 2 L of ion-exchanged water. After the addition of 605 g of 85% phosphoric acid, 220 g of lithium hydroxide, 320 g of vanadium pentoxide, and 170 g of sucrose, the mixture was stirred at room temperature (25° C.) to obtain an ocherous raw material mixture.

Second Step

The raw material mixture was heated at 95° C. for 1 hour with stirring to effect a precipitation reaction to obtain a green reaction mixture including a precipitate.

The average particle size of the precipitate was measured using a laser scattering/diffraction particle size analyzer ("9320-X100" manufactured by Nikkiso Co., Ltd.), and found to be 30 µm.

Third Step

After cooling the reaction mixture, the reaction mixture was ground using a bead mill (wet grinder) charged with zirconia balls having a diameter of 0.5 mm until the ground particles contained in the reaction mixture had an average particle size ($D_{50}$) of 2.0 µm or less to obtain a dispersion slurry.

Fourth Step

The dispersion slurry was supplied to a spray dryer (hot blast inlet temperature: 230° C., hot blast outlet temperature: 120° C.) to obtain a reaction precursor. The average particle size of the secondary particles of the reaction precursor determined by SEM observation was 25 µm.

The reaction precursor was subjected to X-ray powder diffraction measurement using CuKα-rays. A diffraction peak (2θ=14°) attributed to lithium phosphate, a diffraction peak (2θ=29°) attributed to vanadium hydrogen phosphate, and a diffraction peak attributed to an unidentified crystalline compound were observed. It was thus confirmed that the reaction precursor was a mixture of lithium phosphate, vanadium hydrogen phosphate, and an unidentified crystalline compound.

Fifth Step

The reaction precursor was placed in a saggar made of mullite, and calcined at 900° C. for 12 hours in a nitrogen atmosphere.

Disintegration

The calcined product was disintegrated using a jet mill to obtain a lithium vanadium phosphate-carbon composite sample.

Figure 4:
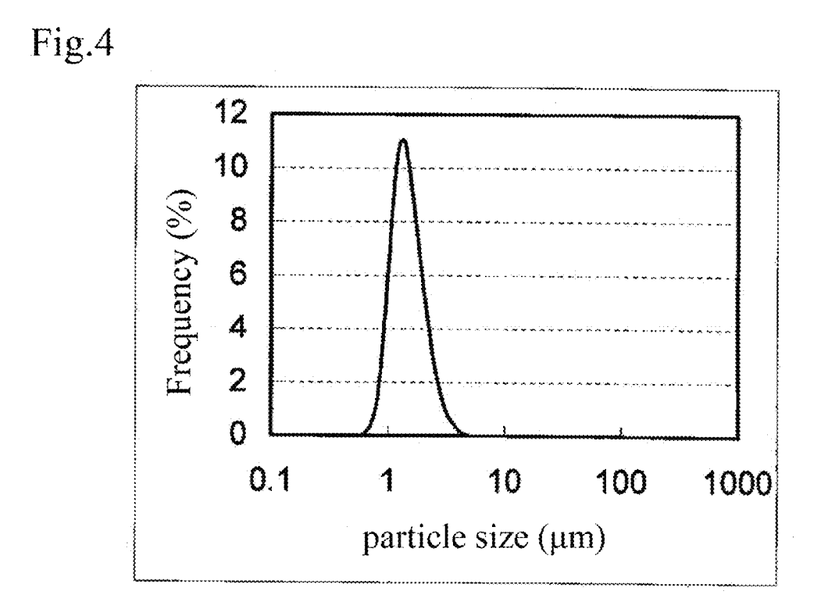
FIG. 4 shows the particle size distribution of the lithium vanadium phosphate-carbon composite sample obtained in Example 2.

FIG. 4 shows the particle size distribution measurement results for the lithium vanadium phosphate-carbon composite sample.

Example 3

First Step

A 5 L beaker was charged with 2 L of ion-exchanged water. After the addition of 605 g of 85% phosphoric acid, 220 g of lithium hydroxide, 320 g of vanadium pentoxide, and 80 g of sucrose, the mixture was stirred at room temperature (25° C.) to obtain an ocherous raw material mixture.

Second Step

The raw material mixture was heated at 95° C. for 1 hour with stirring to effect a precipitation reaction to obtain a green reaction mixture including a precipitate.

The average particle size of the precipitate was measured using a laser scattering/diffraction particle size analyzer ("9320-X100" manufactured by Nikkiso Co., Ltd.), and found to be 30 µm.

Third Step

After cooling the reaction mixture, the reaction mixture was ground using a bead mill (wet grinder) charged with zirconia balls having a diameter of 0.5 mm until the ground particles contained in the reaction mixture had an average particle size ($D_{50}$) of 2.0 µm or less to obtain a dispersion slurry.

Fourth Step

The dispersion slurry was supplied to a spray dryer (hot blast inlet temperature: 230° C., hot blast outlet temperature: 120° C.) to obtain a reaction precursor. The average particle size of the secondary particles of the reaction precursor determined by SEM observation was 25 µm.

The reaction precursor was subjected to X-ray powder diffraction measurement using CuKα-rays. A diffraction peak (2θ=14°) attributed to lithium phosphate, a diffraction peak (2θ=29°) attributed to vanadium hydrogen phosphate, and a diffraction peak attributed to an unidentified crystalline compound were observed. It was thus confirmed that the reaction precursor was a mixture of lithium phosphate, vanadium hydrogen phosphate, and an unidentified crystalline compound.

Fifth Step

The reaction precursor was placed in a saggar made of mullite, and calcined at 900° C. for 12 hours in a nitrogen atmosphere.

Disintegration

The calcined product was disintegrated using a jet mill to obtain a lithium vanadium phosphate-carbon composite sample.

Example 4

First Step

A 5 L beaker was charged with 2 L of ion-exchanged water. After the addition of 605 g of 85% phosphoric acid, 220 g of lithium hydroxide, 312 g of vanadium pentoxide, 6 g of magnesium hydroxide, and 170 g of sucrose, the mixture was stirred at room temperature (25° C.) to obtain an ocherous raw material mixture.

Second Step

The raw material mixture was heated at 95° C. for 1 hour with stirring to effect a precipitation reaction to obtain a green reaction mixture including a precipitate.

The average particle size of the precipitate was measured using a laser scattering/diffraction particle size analyzer ("9320-X100" manufactured by Nikkiso Co., Ltd.), and found to be 30 µm.

Third Step

After cooling the reaction mixture, the reaction mixture was ground using a bead mill (wet grinder) charged with zirconia balls having a diameter of 0.5 mm until the ground particles contained in the reaction mixture had an average particle size ($D_{50}$) of 2.0 µm or less to obtain a dispersion slurry.

Fourth Step

The dispersion slurry was supplied to a spray dryer (hot blast inlet temperature: 230° C., hot blast outlet temperature: 120° C.) to obtain a reaction precursor. The average particle size of the secondary particles of the reaction precursor determined by SEM observation was 25 µm.

The reaction precursor was subjected to X-ray powder diffraction measurement using CuKα-rays. A diffraction peak (2θ=14°) attributed to lithium phosphate, a diffraction peak (2θ=29°) attributed to vanadium hydrogen phosphate, and a diffraction peak attributed to an unidentified crystalline compound were observed. It was thus confirmed that the reaction precursor was a mixture of lithium phosphate, vanadium hydrogen phosphate, and an unidentified crystalline compound.

Fifth Step

The reaction precursor was placed in a saggar made of mullite, and calcined at 900° C. for 12 hours in a nitrogen atmosphere.

Disintegration

The calcined product was disintegrated using a jet mill to obtain a lithium vanadium phosphate-carbon composite sample.

Example 5

First Step

A 5 L beaker was charged with 2 L of ion-exchanged water. After the addition of 605 g of 85% phosphoric acid, 195 g of lithium carbonate, 320 g of vanadium pentoxide, and 120 g of sucrose, the mixture was stirred at room temperature (25° C.) to obtain an ocherous raw material mixture.

Second Step

The raw material mixture was heated at 95° C. for 1 hour with stirring to effect a precipitation reaction to obtain a green reaction mixture including a precipitate.

The average particle size of the precipitate was measured using a laser scattering/diffraction particle size analyzer ("9320-X100" manufactured by Nikkiso Co., Ltd.), and found to be 30 μm.

Third Step

After cooling the reaction mixture, the reaction mixture was ground using a bead mill (wet grinder) charged with zirconia balls having a diameter of 0.5 mm until the ground particles contained in the reaction mixture had an average particle size ($D_{50}$) of 2.0 μm or less to obtain a dispersion slurry.

Fourth Step

The dispersion slurry was supplied to a spray dryer (hot blast inlet temperature: 230° C., hot blast outlet temperature: 120° C.) to obtain a reaction precursor. The average particle size of the secondary particles of the reaction precursor determined by SEM observation was 25 μm.

The reaction precursor was subjected to X-ray powder diffraction measurement using CuKα-rays. A diffraction peak (2θ=14°) attributed to lithium phosphate, a diffraction peak (2θ=29°) attributed to vanadium hydrogen phosphate, and a diffraction peak attributed to an unidentified crystalline compound were observed. It was thus confirmed that the reaction precursor was a mixture of lithium phosphate, vanadium hydrogen phosphate, and an unidentified crystalline compound.

Fifth Step

The reaction precursor was placed in a saggar made of mullite, and calcined at 900° C. for 12 hours in a nitrogen atmosphere.

Disintegration

The calcined product was disintegrated to obtain a lithium vanadium phosphate-carbon composite sample.

Comparative Example 1

Figure 5:
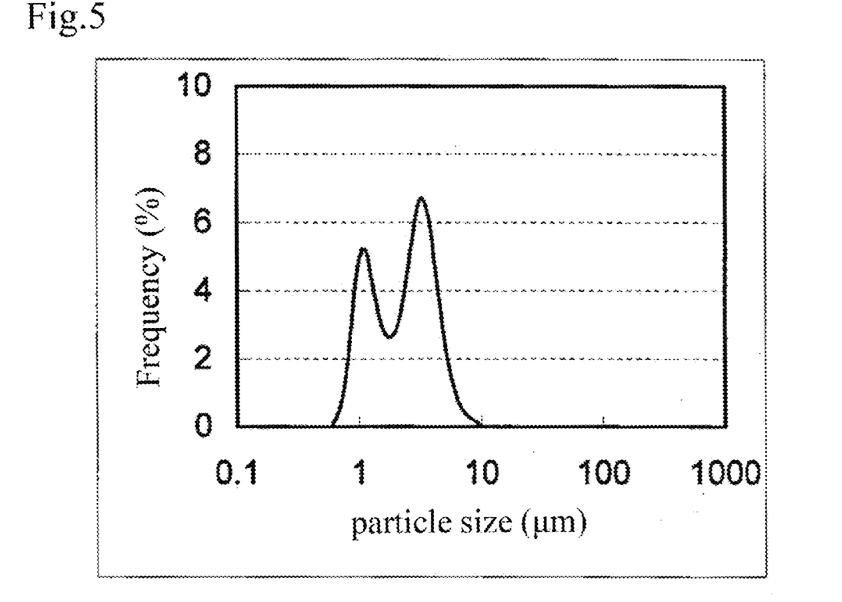
FIG. 5 shows the particle size distribution of the lithium vanadium phosphate-carbon composite sample obtained in Comparative Example 1.

A 5 L beaker was charged with 2 L of ion-exchanged water, and 252 g of lithium hydroxide was added to the beaker, and dissolved. After the addition of 364 g of vanadium pentoxide to the solution, the mixture was stirred for 1 hour. After the addition of 72 g of glucose and 692 g of 85% phosphoric acid to the mixture, the mixture was stirred for 1 hour to obtain a raw material mixture. The raw material mixture was supplied to a spray dryer (hot blast inlet temperature: 230° C., hot blast outlet temperature: 120° C.) to obtain a spray-dried product. The spray-dried product was placed in a saggar made of mullite, and calcined at 900° C. for 12 hours in a nitrogen atmosphere. The calcined product was disintegrated using a jet mill to obtain a lithium vanadium phosphate-carbon composite sample. FIG. 5 shows the particle size distribution measurement results for the lithium vanadium phosphate-carbon composite sample.

Evaluation of Properties of Lithium Vanadium Phosphate-Carbon Composite

Figure 6:
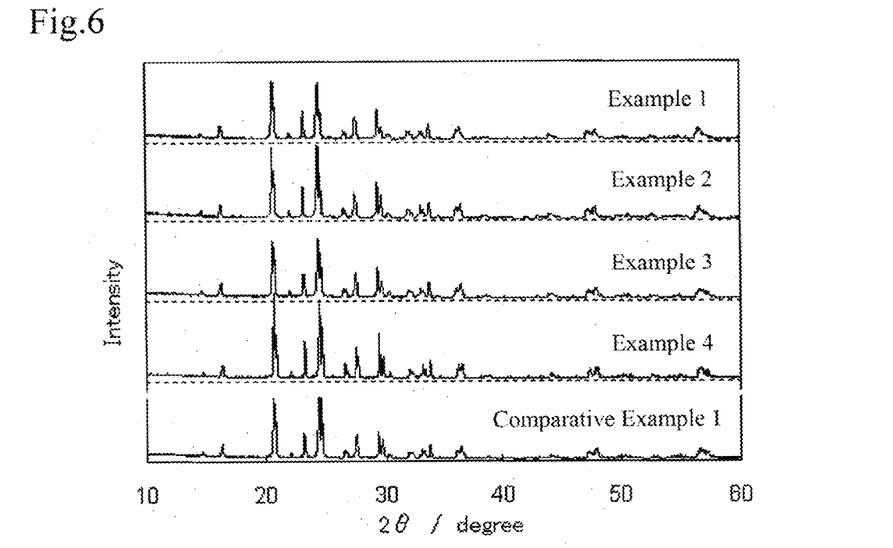
FIG. 6 shows the X-ray diffraction chart of the lithium vanadium phosphate-carbon composite samples obtained in Examples 1 to 4 and Comparative Example 1.

The content of each component, the content of the conductive carbon material, and the average particle size were measured using the lithium vanadium phosphate-carbon composites obtained in Examples 1 to 5 and Comparative Example 1. The results are shown in Table 1. FIG. 6 shows the X-ray diffraction analysis results.

The content of each component was measured by ICP optical emission spectroscopy, and the average particle size was measured using a laser scattering/diffraction particle size analyzer ("9320-X100" manufactured by Nikkiso Co., Ltd.). The content of the conductive carbon material was determined by measuring the carbon atom content using a total organic carbon (TOC) analyzer ("TOC-5000A" manufactured by Shimadzu Corporation).

TABLE 1

| | Component | | | | Conductive carbon material Carbon atom content (wt %) | $D_{50}$ (μm) | X-ray diffraction analysis results |
|---|---|---|---|---|---|---|---|
| | Content (wt %) | | | | | | |
| | Li | V | P | Me | | | |
| Example 1 | 4.9 | 23.7 | 22.4 | — | 2.9 | 25 | Single-phase $Li_3V_2(PO_4)_3$ |
| Example 2 | 4.9 | 23.9 | 22.3 | — | 2.8 | 1.5 | Single-phase $Li_3V_2(PO_4)_3$ |
| Example 3 | 5.0 | 24.4 | 23 | — | 0.1 | 1.3 | Single-phase $Li_3V_2(PO_4)_3$ |
| Example 4 | 5.0 | 24.4 | 22.9 | 0.3 | 2.7 | 1.5 | Single-phase $Li_3V_2(PO_4)_3$ |
| Example 5 | 5.0 | 24.5 | 22.7 | — | 1.0 | 2.8 | Single-phase $Li_3V_2(PO_4)_3$ |
| Comparative Example 1 | 5.3 | 24.4 | 22.9 | — | 0.1 | 2.3 | Single-phase $Li_3V_2(PO_4)_3$ |

Note:
Me in Example 4 is Mg.

Evaluation of Battery Performance

Battery Performance Test (1) Production of Lithium Secondary Battery 91 mass % of the lithium vanadium phosphate-carbon composite sample (Example 1 to 3 and Comparative Example 1), 6 mass % of a graphite powder, and 3 mass % of polyvinylidene fluoride were mixed to prepare a cathode material. The cathode material was dispersed in N-methyl-2-pyrrolidinone to prepare a paste. The paste was applied to an aluminum foil, dried, pressed, and punched in the shape of a disc having a diameter of 15 mm to obtain a cathode plate.

A lithium secondary battery was produced using a separator, an anode, a cathode (cathode plate), a current collector, mounting hardware, an external terminal, an electrolyte solution, and the like. A lithium metal foil was used as the anode, and a solution prepared by dissolving 1 mol of $LiPF_6$ in 1 L of a 1:1 mixture of ethylene carbonate and methylethyl carbonate was used as the electrolyte solution.

(2) Evaluation of Battery Performance

The lithium secondary battery was operated under the following conditions, and the battery performance was evaluated.

Cycle Characteristic Evaluation 1

The lithium secondary battery was charged by constant current/constant voltage (CCCV) charging (total charging time: 5 hours (charged to 4.5 V at 0.5 C, and held at 4.5 V)), and discharged by constant current (CC) discharging (discharged to 2.0 V at 0.1 C) (=one cycle). The discharge capacity was measured in each cycle. The above cycle was performed 20 times, and the capacity ratio was calculated from the discharge capacity in the first cycle and the discharge capacity in the twentieth cycle using the following expression. The discharge capacity in the first cycle was determined to be the initial discharge capacity.

Capacity ratio (%)=((discharge capacity in twentieth cycle)/(discharge capacity in first cycle))×100

TABLE 2

|  | Initial discharge capacity (mAhg$^{-1}$) | Capacity ratio (%) |
| --- | --- | --- |
| Example 1 | 141 | 100 |
| Example 2 | 135 | 100 |
| Example 3 | 111 | 91 |
| Comparative Example 1 | 102 | 80 |

Cycle Characteristic Evaluation 2

The cycle characteristics of the lithium secondary battery produced using the lithium vanadium phosphate-carbon composite sample of Example 2 or 5 were evaluated under the following conditions.

The lithium secondary battery was charged by constant current/constant voltage (CCCV) charging (total charging time: 5 hours (charged to 4.6 V at 0.5 C, and held at 4.6 V)), and discharged by constant current (CC) discharging (discharged to 2.0 V at 0.1 C) (=one cycle). The discharge capacity was measured in each cycle. The above cycle was performed 20 times, and the capacity ratio was calculated from the discharge capacity in the first cycle and the discharge capacity in the twentieth cycle using the following expression. The discharge capacity in the first cycle was determined to be the initial discharge capacity.

Capacity ratio (%)=((discharge capacity in twentieth cycle)/(discharge capacity in first cycle))×100

TABLE 3

|  | Initial discharge capacity (mAhg$^{-1}$) | Capacity ratio (%) |
| --- | --- | --- |
| Example 2 | 170 | 82 |
| Example 5 | 177 | 81 |

INDUSTRIAL APPLICABILITY

The invention can industrially advantageously provide a lithium vanadium phosphate-carbon composite that includes lithium vanadium phosphate and a conductive carbon material, and is useful as a cathode active material for a lithium secondary battery. A lithium secondary battery that utilizes a lithium vanadium phosphate-carbon composite obtained by the production process according to the embodiments of the invention as the cathode active material has a high discharge capacity, and exhibits excellent cycle characteristics.

The invention claimed is:

1. A process for producing a lithium vanadium phosphate-carbon composite that includes lithium vanadium phosphate having a NASICON structure, and a conductive carbon material, the process comprising:
    a first step that includes mixing a lithium source, a tetravalent or pentavalent vanadium compound, a phosphorus source, and a conductive carbon material source that produces carbon through pyrolysis, in an aqueous solvent to prepare a raw material mixture;
    a second step that includes heating the raw material mixture to 60 to 100° C. to effect a precipitation reaction to obtain a reaction mixture that includes a precipitate;
    a third step that includes subjecting the reaction mixture that includes the precipitate to wet grinding using a media mill to obtain a slurry that includes ground particles;
    a fourth step that includes spray-drying the slurry that includes the ground particles to obtain a reaction precursor; and
    a fifth step that includes calcining the reaction precursor at 600 to 1300° C. in an inert gas atmosphere or a reducing atmosphere,
    the phosphorus source being at least one phosphorus source selected from phosphoric acid, polyphosphoric acid, phosphoric anhydride, ammonium dihydrogen phosphate, diammonium hydrogen phosphate, and ammonium phosphate, and
    the precipitate including at least lithium phosphate and vanadium hydrogen phosphate.

2. The process according to claim 1, wherein the ground particles included in the slurry obtained by the third step have an average particle size of 2 µm or less.

3. The process according to claim 1, wherein the lithium source is lithium hydroxide.

4. The process according to claim 1, wherein the tetravalent or pentavalent vanadium compound is vanadium pentoxide.

5. The process according to claim 1, wherein the phosphorus source is phosphoric acid.

6. The process according to claim 1, wherein the conductive carbon material source is a saccharide.

7. The process according to claim 1, wherein the first step further includes mixing an Me source (Me is a metal element or a transition metal element other than V that has an atomic number equal to or larger than 11) into the raw material mixture.

* * * * *